US012247710B2

(12) United States Patent
Noma et al.

(10) Patent No.: US 12,247,710 B2
(45) Date of Patent: Mar. 11, 2025

(54) LIGHT SOURCE AND LIGHT EMITTING MODULE

(71) Applicant: NICHIA CORPORATION, Anan (JP)

(72) Inventors: Shintaro Noma, Anan (JP); Tsuyoshi Okahisa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/735,265

(22) Filed: Jun. 6, 2024

(65) Prior Publication Data

US 2024/0318794 A1 Sep. 26, 2024

Related U.S. Application Data

(63) Continuation of application No. 18/481,913, filed on Oct. 5, 2023, now Pat. No. 12,038,142, which is a (Continued)

(30) Foreign Application Priority Data

Sep. 28, 2021 (JP) ................................ 2021-157879

(51) Int. Cl.

*F21K 9/66* (2016.01)
*F21K 9/64* (2016.01)
*F21Y 115/10* (2016.01)

(52) U.S. Cl.

CPC .................. *F21K 9/66* (2016.08); *F21K 9/64* (2016.08); *F21Y 2115/10* (2016.08)

(58) Field of Classification Search

CPC .......... F21K 9/66; F21K 9/64; F21Y 2115/10; F21Y 2105/16; F21V 13/08; F21V 7/0083; F21V 9/30; F21V 19/0015

See application file for complete search history.

(56) References Cited

U.S. PATENT DOCUMENTS

2013/0001605 A1 1/2013 Ishihara et al.
2013/0069525 A1 3/2013 Imai
(Continued)

FOREIGN PATENT DOCUMENTS

JP 2009-152482 A 7/2009
JP 2013-016588 A 1/2013
(Continued)

OTHER PUBLICATIONS

Non Final Office Action in the related U.S. Appl. No. 17/953,032, dated Mar. 9, 2023.

*Primary Examiner* — Anne M Hines
*Assistant Examiner* — Jose M Diaz
(74) *Attorney, Agent, or Firm* — Global IP Counselors, LLP

(57) ABSTRACT

A light source includes a plurality of light-transmissive members and a plurality of light emitting elements. Upper surfaces of the light-transmissive members are flush with each other. The light-transmissive members include a plurality of first light-transmissive members arranged to form a rectangular shape as a whole in a plan view, and a plurality of second light-transmissive members arranged in a rectangular frame shape as a whole surrounding the first light-transmissive members in the plan view. Each of the second light-transmissive members is smaller than each of the first light-transmissive members in the plan view. The light emitting elements are arranged under the first light-transmissive members with none of the light emitting elements being arranged under the second light-transmissive members.

14 Claims, 13 Drawing Sheets

Related U.S. Application Data continuation of application No. 17/953,032, filed on Sep. 26, 2022, now Pat. No. 11,815,231.

(56) References Cited

U.S. PATENT DOCUMENTS

| | | | |
|---|---|---|---|
| 2018/0094796 | A1 | 4/2018 | Hayashi |
| 2018/0331326 | A1 | 11/2018 | Woo et al. |
| 2019/0237441 | A1 | 8/2019 | Higashisaka |
| 2020/0117046 | A1 | 4/2020 | Hwang et al. |

FOREIGN PATENT DOCUMENTS

| | | | |
|---|---|---|---|
| JP | 2013-069765 | A | 4/2013 |
| JP | 2016-219637 | A | 12/2016 |
| JP | 2018-056514 | A | 4/2018 |
| JP | 2018-139285 | A | 9/2018 |
| JP | 2019-132893 | A | 8/2019 |
| JP | 2021-131928 | A | 9/2021 |

LIGHT SOURCE AND LIGHT EMITTING MODULE

CROSS-REFERENCE TO RELATED APPLICATION

This application is a continuation application of U.S. patent application Ser. No. 18/481,913, filed on Oct. 5, 2023, which is a continuation application of U.S. patent application Ser. No. 17/953,032, filed on Sep. 26, 2022, now U.S. Pat. No. 11,815,231. This application claims priority to Japanese Patent Application No. 2021-157879, filed on Sep. 28, 2021. The entire disclosures of U.S. patent application Ser. Nos. 17/953,032 and 18/481,913, and Japanese Patent Application No. 2021-157879 are hereby incorporated herein by reference.

BACKGROUND

The present disclosure relates to a light source and a light emitting module.

A light source in which a plurality of light emitting elements are arranged two-dimensionally has been used in recent years in various fields, such as display devices, lighting devices, and flash devices. Such a light source can perform partial irradiation in which the irradiation region is varied, by driving only some of a plurality of light emitting elements. For instance, Japanese Patent Publication No. 2016-219637A discloses a light source that can be used in a vehicle headlight that affords variable light distribution.

SUMMARY

It is an object of the present disclosure to provide a light source and a light emitting module having excellent light emission characteristics during partial irradiation.

The embodiments include the aspects described below.

A light source includes a plurality of light-transmissive members and a plurality of light emitting elements. Upper surfaces of the light-transmissive members are flush with each other. The light-transmissive members include a plurality of first light-transmissive members arranged to form a rectangular shape as a whole in a plan view, and a plurality of second light-transmissive members arranged in a rectangular frame shape as a whole surrounding the first light-transmissive members in the plan view. Each of the second light-transmissive members is smaller than each of the first light-transmissive members in the plan view. The light emitting elements are arranged under the first light-transmissive members with none of the light emitting elements being arranged under the second light-transmissive members.

An embodiment of the present disclosure provides a light source and a light emitting module having excellent light emitting characteristics during partial irradiation.

DETAILED DESCRIPTION OF EMBODIMENTS

Figure 1A:
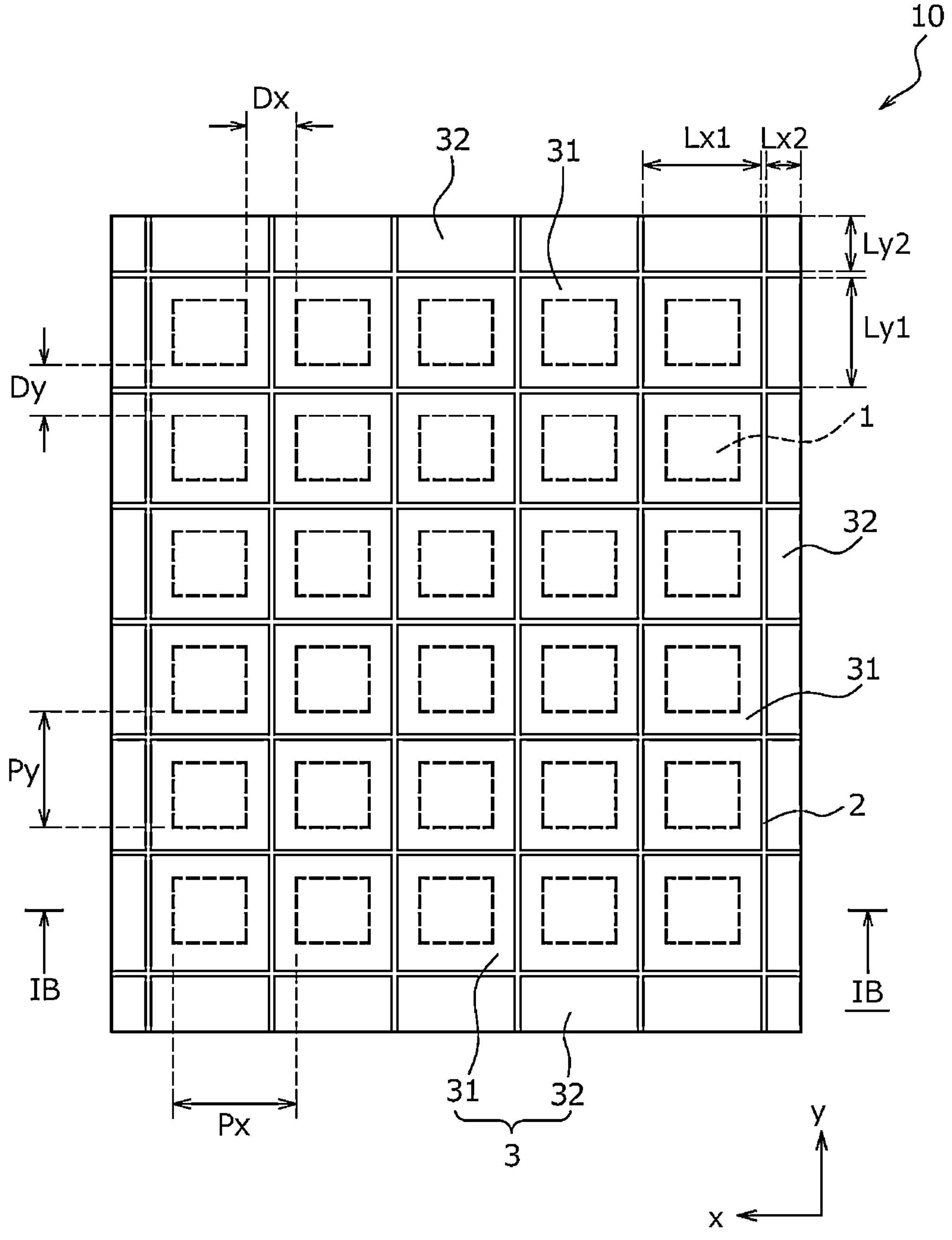
FIG. 1A is a schematic top view showing the light source in an embodiment of the present disclosure.

Certain embodiments of the present disclosure will be explained below with reference to the drawings. The embodiments described below are provided to give shape to the technical ideas of the present invention and are not intended to limit the present invention. The sizes of and relative positions of the members shown in the drawings might be exaggerated for clarity of explanation. An end view showing only the cut surface may be used as a cross-sectional drawing. In the explanation below, the same designations and reference numerals denote the same or similar members, in principle, for which a redundant explanation will be omitted as appropriate. In this specification, terms such as "covering" and "covered" are not limited to cases of direct contact, but also include cases of indirect covering (e.g., through other members), unless otherwise specified.

Light Source

Figure 1B:
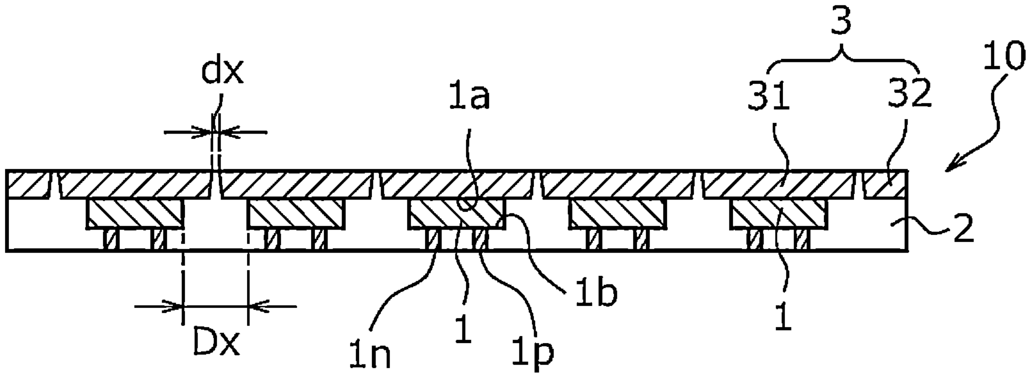
FIG. 1B is a cross-sectional view along the IB-IB' line in FIG. 1A.

As shown in FIGS. 1A and 1B, the light source 10 in an embodiment includes a plurality of light emitting elements 1, a light blocking member 2 that collectively holds the plurality of light emitting elements 1, and a plurality of light-transmissive members 3. Here, the light blocking member 2 exposes the upper surface of the light emitting elements 1, is disposed in regions between the plurality of light emitting elements and in the outer periphery region located outwardly of all the light emitting elements in the plan view, and collectively holds the plurality of light emitting elements. The plurality of light-transmissive members 3 include a plurality of first light-transmissive members 31 that are respectively disposed on the plurality of light emitting elements, and second light-transmissive members 32 (a second light-transmissive member and additional second light-transmissive members) that are disposed on the light blocking member located on the outer periphery of the plurality of light emitting elements 1.

Disposing the members in this way effectively suppresses uneven light emission in the light source. In particular, in the case where only some of the light emitting elements, for example, a few or just one light emitting element is lit, the light emission state can be made uniform or substantially uniform and uneven light emission can be reduced regardless of the position of the light emitting elements that are lit (for example, the center or the edges of the plurality of light emitting elements).

Figure 2:
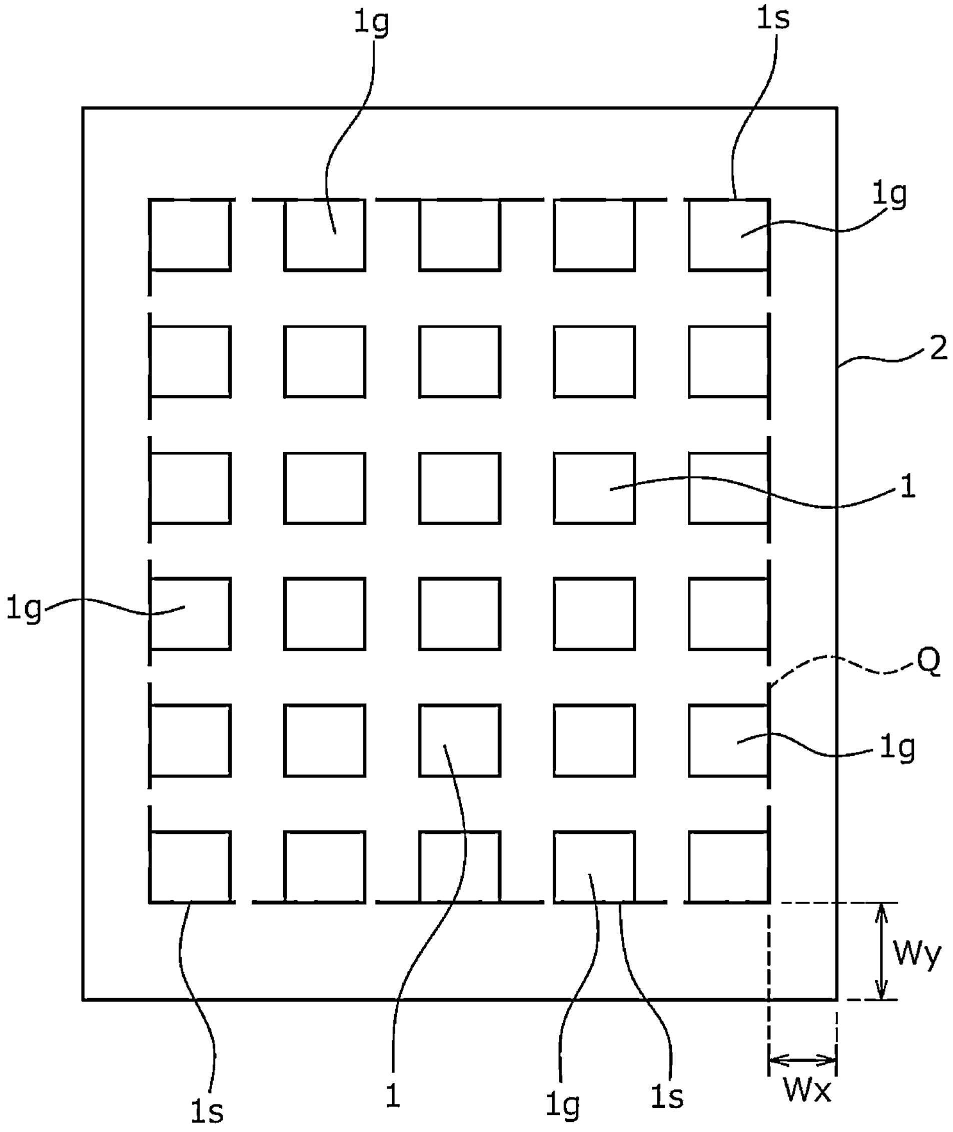
FIG. 2 is a schematic top view for describing the positional relationship between the light emitting element and the light blocking member in the light source in an embodiment.

As shown in FIG. 2, the outer periphery around the plurality of light emitting elements refers to the portion surrounding the contour (broken line Q) connecting the outer lateral surfaces 1*s* of the light emitting elements 1*g* located on the outer side, among the plurality of light emitting elements disposed in a matrix in plan view. In other words, it refers to the region outside the contour (broken line Q) that surrounds all of the plurality of light emitting elements 1 in plan view, said region extending to the end of the light blocking member 2 (discussed below).

Light Emitting Elements 1

The light emitting elements 1 are disposed two-dimensionally, and may be disposed randomly, but are preferably disposed regularly, and are more preferably disposed in a matrix. For example, it is preferable for these elements to be regularly arranged in two dimensions along two directions. The arrangement pitch in each direction may be different. For example, a plurality of light emitting elements 1 may be arranged so that their spacing increases going from the center toward the outer periphery. In particular, as shown in FIG. 1A, it is preferable for the plurality of light emitting elements 1 to be disposed regularly and evenly spaced along the X direction and the Y direction, which are perpendicular to each other. In FIG. 1A, light emitting elements 1 are arranged in a 5×6 pattern, but can be arranged in various other patterns, such as 7×9. The arrangement pitch of the light emitting elements can be appropriately set according to the size of the light emitting elements, the size of the first light-transmissive members, and so forth. For example, in the case where the length in the X direction of one side, the diameter, etc., of a light emitting element is at least 100 μm and no more than 1000 μm, the pitch Px in the X direction may be at least 110 μm and no more than 2000 μm. In the same way, in the case where the length in the Y direction of one side, the diameter, etc., of a light emitting element is at least 100 μm and no more than 1000 μm, the pitch Py in the Y direction may be at least 110 μm and no more than 2000 μm. The distance Dx between adjacent light emitting elements in the x direction and the distance Dy between adjacent light emitting elements in the y direction may be different or the same.

The light emitting element 1 is a semiconductor light emitting element and the known light emitting elements such as semiconductor lasers and light emitting diodes can be utilized as the light emitting elements 1. For example, the light emitting element 1 is a light emitting diode. The wavelength of light emitted from the light emitting element 1 can be selected any wavelength. For example, as a light emitting element that emits light with blue to green wavelengths, elements using ZnSe, nitride semiconductors ($In_xAl_yGa_{1-x-y}N$, 0≤x, 0≤y, x+y<1), GaP, etc. can be used. In addition, as light-emitting elements that emit light at red wavelengths, elements including semiconductors such as GaAlAs and AlInGaP and other semiconductors can be used. Furthermore, semiconductor light emitting elements formed from materials other than these can also be used for the light emitting element 1. The composition of the semiconductors used, the luminescence color, size, and the number of light-emitting elements can be selected according to the purpose and designs. The plurality of light-emitting elements may be all light-emitting elements emitting light of the same wavelength, or may be light-emitting elements emitting light of different wavelengths in part or in whole.

The light emitting element 1 has a light-transmissive support substrate and a semiconductor stacked body on the support substrate, for example. The semiconductor stacked body includes an active layer, an n-type semiconductor layer and a p-type semiconductor layer sandwiching the active layer. The light emitting element 1 preferably includes a nitride semiconductor capable of emitting short wavelength light ($In_xAl_yGa_{1-x-y}N$, 0≤x, 0≤y, x+. y<1). The emission wavelength can be selected in various ways depending on the semiconductor material and/or its degree of miscibility.

In the light emitting element 1, a negative electrode In and a positive electrode 1*p* are electrically connected to the n-type and p-type semiconductor layers, respectively. The light emitting element 1 has an upper surface 1*a*, which is the main light emitting surface (hereinafter referred to as the light emitting surface), and a lower surface 1*b*, which is located on the opposite side of the upper surface 1*a*. The light emitting element 1 may have the positive electrode and the negative electrode on the same side or on different sides. In particular, the light emitting element 1 preferably have a positive electrode 1*p* and a negative electrode In on the lower surface 1*b*. This arrangement of electrodes allows the light emitting element to be flip-chip mounted on a mounting substrate.

The light emitting elements may have a planar shape that is triangular, quadrangular, hexagonal, or another such polygonal shape, or may be circular or elliptical, but are preferably rectangular. The size of each light emitting element can be appropriately set as dictated by the desired performance and so forth. For instance, the shape of the upper surface 1*a* may be a rectangle with side length at least 100 μm and no more than 1000 μm× at least 100 μm and no more than 1000 μm, and a rectangle with side length at least 150 μm and no more than 500 μm× at least 150 μm and no more than 500 μm is preferable. This allows the light source equipped with the plurality of light emitting elements to be more compact.

For example, the light emitting elements 1 are preferably each rectangular in plan view, and are disposed in a rectangular shape as a whole, i.e., the outer shapes of the plurality of light emitting elements 1 are disposed to form a rectangle, as shown in broken line Q in FIG. 2.

Light Blocking Member 2

The function of the light blocking member 2 is to protect the light emitting elements 1. The light blocking member 2 also has the function of reflecting light emitted from the lateral surfaces of the light emitting elements 1 and guiding this light to above the light emitting elements 1. This improves the utilization efficiency of the light emitted from the light emitting elements 1. The light blocking member 2 is disposed between the light emitting elements 1 and on the outer periphery of all the light emitting elements 1. Consequently, the light blocking member 2 can collectively hold the plurality of light emitting elements 1. Also, the light blocking member 2 exposes the upper surfaces of the light emitting elements 1. In other words, the light emitting surfaces of the light emitting elements 1 are exposed from the light blocking member 2. The light blocking member 2 preferably also covers the lower surfaces 1*b* exposed from the positive electrodes and negative electrodes of the light emitting elements 1. This allows the light emitted from the light emitting elements to be efficiently extracted from the light emitting surfaces. However, the light blocking member 2 exposes the lower surfaces of the electrodes.

In the case where the light emitting elements 1 are mounted on a mounting substrate, and particularly the light emitting elements 1 are flip-chip mounted, the light blocking member 2 may be disposed in between the light emitting elements 1 and the mounting substrate, that is, so as to fill in the spaces between the lower surfaces 1*b* of the light emitting elements 1 and the upper surfaces of the mounting substrates.

As described above, the light blocking member 2 is preferably disposed on the outer periphery of the plurality of light emitting elements 1 with a specific width in the X direction or the Y direction (Wx and Wy in FIG. 2) from the lateral surfaces 1*s* of the light emitting elements 1. These specific widths Wx and Wy are preferably equal to or greater than the distances Dx and Dy between the light emitting elements, respectively, for example. Consequently, the light emitted from the light emitting elements located on the outside of the group of light emitting elements can be distributed upward, which reduces leakage of light from the lateral surfaces of the light source. Both the widths Wx and Wy can be within the range of, for example, at least 5% and no more than 200% of the width of the light emitting elements in the same direction.

The light blocking member 2 is a member having the property of reflecting light and/or absorbing light. The light blocking member 2 preferably has high light reflectivity. This allows the light emitted from the lateral surfaces of the light emitting elements 1 to be reflected and extracted from the upper surfaces, resulting in a light source with superior light extraction efficiency. More specifically, the light blocking member 2 preferably has a reflectance of at least 60%, and more preferably at least 80%, with respect to the light emitted from the light emitting elements.

The light blocking member 2 contains a resin as a base material, and particles of a light-reflecting substance contained in the resin. Examples of the resin include one or more of the following resins such as silicone resin, modified silicone resin, epoxy resin, modified epoxy resin, acrylic resin and fluororesin. Examples of light-reflecting substances include titanium oxide, aluminum oxide, silicon oxide, and zinc oxide. The average particle size of the light-reflecting substance is, for example, at least 0.05 μm and no more than 30 μm. The light blocking member 2 may further contain a pigment, a light absorber such as carbon black, a phosphor, or the like. In the light blocking member 2, the particles of the light-reflecting substance are preferably dispersed in the resin.

Light-Transmissive Members 3

The light-transmissive members 3 include a plurality of first light-transmissive members 31 that are respectively disposed on the plurality of light emitting elements 1, and second light-transmissive members 32 that are disposed on the light blocking member 2 located outside the entire outer periphery of the group of light emitting elements 1.

The size of the first light-transmissive members 31 may be smaller than, the same as, or larger than the light emitting surfaces of the light emitting elements 1 in plan view, but is preferably the same as or larger than the light emitting surfaces of the light emitting elements. As shown in FIG. 1A, the first light-transmissive members 31 are preferably larger than the light emitting surfaces of the light emitting elements and are disposed so as to encompass the outer edge of the light emitting elements in plan view. The first light-transmissive members 31 preferably have a shape that is the same as or homothetic to that of the light emitting surfaces of the light emitting elements. As shown in FIG. 1A, the plurality of first light-transmissive members 31 included in the light source 10 preferably have the same planar shape and size as one another. The planar surface area of the first light-transmissive members 31 is, for example, at least 100% and no more than 150%, and preferably at least 100% and no more than 130%, of the planar surface area of the light emitting surfaces of the light emitting elements. The first light-transmissive members 31 are preferably arranged on the light emitting elements in the same pattern as the light emitting elements themselves. For example, the distance dx between first light-transmissive members 31 adjacent in the X direction and the distance dy between first light-transmissive members 31 adjacent in the Y direction are preferably less than the distances Dx and Dy between adjacent light emitting elements, respectively. This allows the region of low luminance between adjacent light emitting elements to be smaller. The distance dx and the distance dy may each be, for example, at least 5% and no more than 50% of the length of one side of the light emitting elements. More specifically, the distance dx and the distance dy may each be at least 10 μm and no more than 100 μm. The distance dx and the distance dy may be the same or different from each other.

Figure 3A:
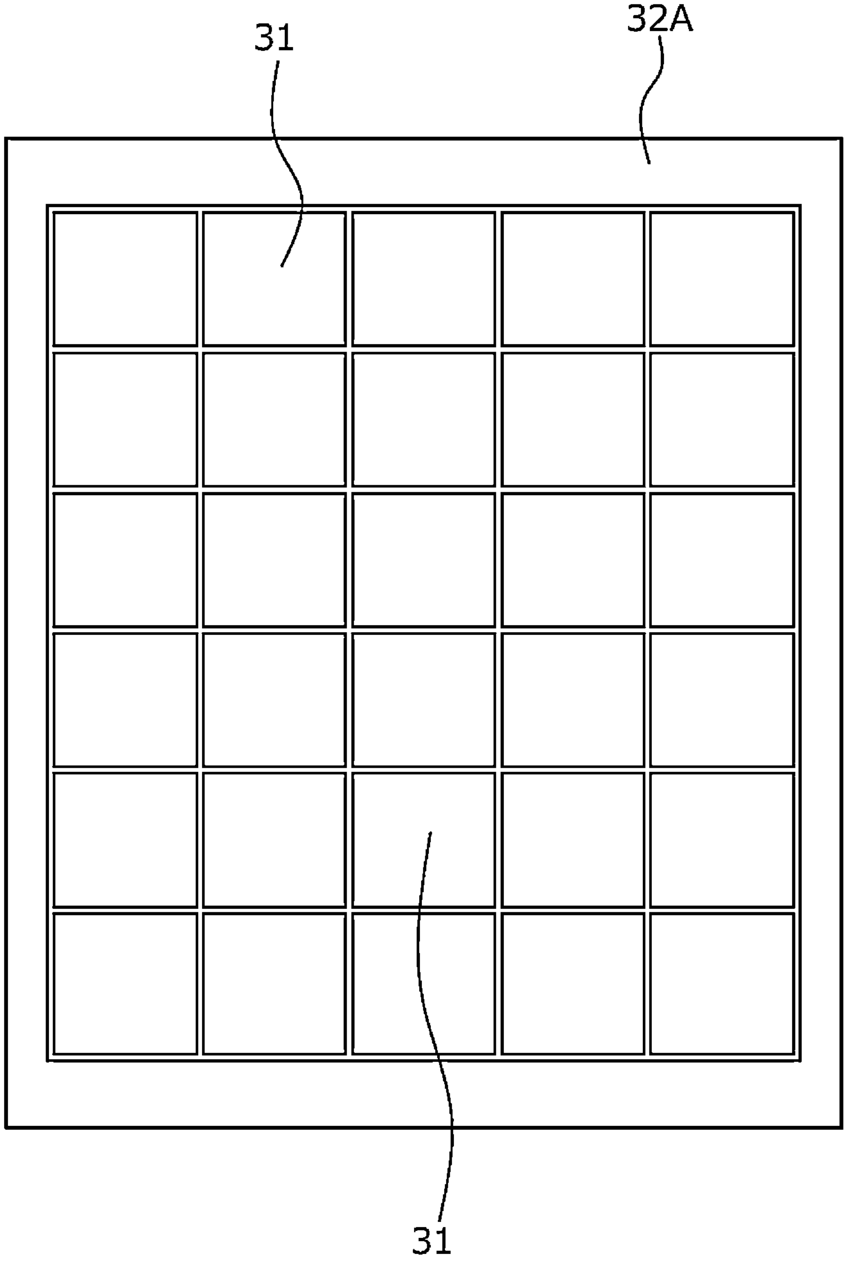
FIG. 3A is a schematic top view showing a modification example of the light-transmissive member in the light source in an embodiment.
Figure 3B:
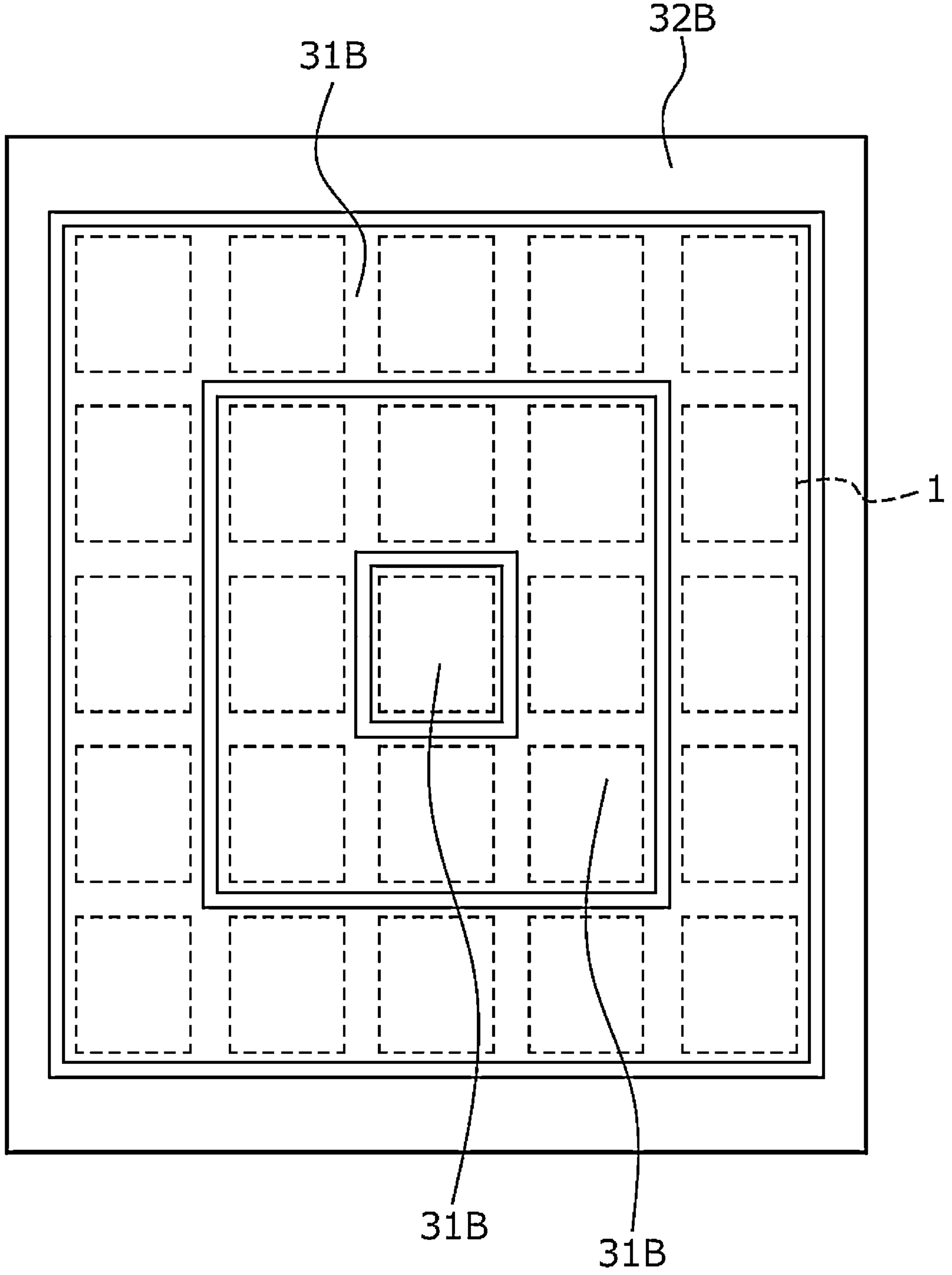
FIG. 3B is a schematic top view showing another modification example of the light-transmissive member in the light source in an embodiment.

One or more of the first light-transmissive members 31 included in the light source may have different planar shapes and/or sizes. For example, as shown in FIG. 3B, the first light-transmissive members 31B may include one that is disposed on the light emitting element 1 in the center, and those that are disposed integrally on the adjacent light emitting elements 1, that is, the light emitting elements 1 surrounding the one light emitting element 1 in the center, and may further include those that are disposed integrally on the light emitting elements 1 that surround these. Thus, the plurality of first light-transmissive members may have different planar shapes and/or sizes.

The plurality of first light-transmissive members 31 are preferably disposed in a rectangular shape as a whole in plan view, the same as the arrangement of the light emitting elements. Furthermore, the plurality of light-transmissive members 3 including one or more second light-transmissive members are preferably disposed in a rectangular shape as a whole i.e., the outer shapes of the plurality of first light-transmissive members 31 are disposed to form a rectangle, as shown in FIG. 3A.

At least one second light-transmissive member 32 may be disposed on the light blocking member 2 disposed on the outer periphery of all the light emitting elements 1, and a plurality of second light-transmissive members 32 may be disposed. In other words, the second light-transmissive member 32 is not disposed on the light emitting elements 1. For example, as shown in FIG. 1A, the second light-transmissive members 32 may be arranged in the X direction and the Y direction, the same as the arrangement of the light-transmissive members 31 disposed on the light emitting elements 1, on the light blocking member 2 that is disposed on the outer periphery of all the light emitting elements 1. In this case, the second light-transmissive members 32 may have the same shape and size as the first light-transmissive members 31, or may have a shape and size including only a part of the first light-transmissive members 31.

The second light-transmissive members 32 may have a shape such that the width varies in the arrangement direction from that of the first light-transmissive members 31 disposed adjacent thereto. In this case, in plan view, the length in the X direction of one side of a second light-transmissive member 32 that is adjacent in the X direction to a first light-transmissive member 31 is preferably at least 5% and no more than 100%, and more preferably at least 25% and no more than 75%, of the length in the X direction of one side of the adjacent first light-transmissive member. The length in the Y direction of one side of a second light-transmissive member 32 adjacent in the X direction to a first light-transmissive member 31 is preferably at least 100% of the length in the Y direction of the adjacent first light-transmissive member. For example, as shown in FIG. 1A, a length (Lx2) of one side of the second light-transmissive member 32 in one arrangement direction or a first direction (i.e., X direction) is preferably at least 5% and no more than 100% of a length (Lx1) of one side of the first light-transmissive member 31 in one arrangement direction or the first direction (i.e., X direction) disposed adjacent in one arrangement direction or the first direction (i.e., X direction) in plan view, as well as, a length (Ly2) of one side of the second light-transmissive member 32 in one arrangement direction or a second direction (i.e., Y direction) is preferably at least 5% and no more than 100% of a length (Ly1) of one side of the first light-transmissive member 31 in one arrangement direction or the second direction (i.e., Y direction) disposed adjacent in one arrangement direction or the second direction (i.e., Y direction) in plan view. Consequently, the spread of light in the X direction in a first light-transmissive member adjacent to a second light-transmissive member 32 can be made to approximate that of a first light-transmissive member that is not adjacent to a second light-transmissive member 32.

For the same reason, the distance between a first light-transmissive member 31 and a second light-transmissive member 32 adjacent to each other in the X direction and/or the Y direction on the light emitting surface of the light source is preferably the same as the distance dx and/or dy between first light-transmissive members 31 that are adjacent in the X direction and/or the Y direction, respectively. The thickness of the first light-transmissive members 31 is preferably the same as the thickness of the second light-transmissive members 32.

As shown in FIG. 3A, one second light-transmissive member 32A may be continuously disposed on the light blocking member 2 disposed on the outer periphery of all the light emitting elements 1, so as to surround all the light emitting elements 1. In this case, the second light-transmissive member 32A is different in shape and size from the first light-transmissive members 31. Furthermore, as shown in FIG. 3B, one second light-transmissive member 32B may be disposed on the light blocking member 2 disposed on the outer periphery of all the light emitting elements 1, so as to surround all the light emitting elements 1.

In the case where a plurality of first light-transmissive members 31 are disposed in an overall rectangular shape in a plan view, one or more second light-transmissive members 32 are preferably disposed along the outer periphery of the rectangular shape.

The upper surfaces of each of the plurality of first light-transmissive members 31 and the second light-transmissive members 32 are exposed from the light blocking member 2. The light blocking member 2 is preferably disposed between adjacent first light-transmissive members 31 and second light-transmissive members 32. In this case, the facing lateral surfaces of an adjacent first light-transmissive member 31 and second light-transmissive member 32 may be partially covered by the light blocking member 2 in just the thickness direction, but it is preferable for them to be covered by the light blocking member 2 in the entire thickness direction. In other words, it is preferable for the upper surface of the light blocking member 2 to be flush with the upper surfaces of the plurality of first light-transmissive members 31 and the second light-transmissive members 32. The lateral surfaces of a second light-transmissive member 32 that are not facing a first light-transmissive member 31 or a second light-transmissive member 32, that is, the lateral surfaces that are facing outwards from the light source, may not be covered by the light blocking member 2. In other words, the second light-transmissive members 32 preferably have a lateral surface, which is exposed from the light blocking member 2 and constitutes the outer lateral surface of the light source.

The light-transmissive members 3 are members that transmit at least some of the light emitted from the light emitting elements 1, an example of which is one that transmits at least 60% of the light emitted from the light emitting elements, and preferably transmits at least 70%, or at least 75%, or at least 80% of the light. These members are preferably plate-shaped.

More specifically, the light-transmissive members 3 have an upper surface that serves as the light emitting surface of the light source, a lower surface on the opposite side from the upper surface, and lateral surfaces in between the upper surface and the lower surface. The lower surface of a first light-transmissive member 31 is disposed so as to face the upper surface of a light emitting element 1, and the lower surface of a second light-transmissive member 32 is disposed so as to face the upper surface of the light blocking member 2 located on the outer periphery of all the light emitting elements 1. The upper surface and the lower surface of a light-transmissive member 3 are preferably flat surfaces that are parallel to each other, and the lateral surfaces may be perpendicular to the upper surface and/or the lower surface, or may have an inclined surface that is inclined with respect to the upper surface and/or the lower surface.

The light-transmissive members 3 can be formed from a light-transmissive resin, glass, ceramic, or the like. One or more resins, including silicone resin, modified silicone resin, epoxy resin, modified epoxy resin, acrylic resin, and fluororesin, can be used as the light-transmissive resin.

Also, the light-transmissive members 3 can contain a phosphor capable of converting the wavelength of at least some of the incident light. Examples of a light-transmissive member 3 containing a phosphor one that contains sintered phosphor, and a phosphor powder that is contained in light-transmissive resin, glass, ceramic, or the like. Also, a light-transmissive layer, such as a resin layer containing a phosphor, may be formed on the surface of a light-transmissive plate that has been formed from a light-transmissive resin, glass, ceramic, or the like.

The examples of the phosphors include yttrium aluminum garnet phosphors (e.g., $Y_3(Al,Ga)_5O_{12}$: Ce); lutetium aluminum garnet phosphors (e.g., $Lu_3(Al,Ga)_5O_{12}$:Ce); terbium aluminum garnet phosphors (e.g., $Tb_3(Al,Ga)_5O_{12}$: Ce); CCA phosphors (e.g., $Ca_{10}(PO_4)_6Cl_2$: Eu); SAE phosphors (e.g. $Sr_4Al_{14}O_{25}$: Eu); chlorosilicate phosphors (e.g., $CasMgSi_4O_{16}C_{12}$: Eu); β sialon phosphors (e.g., $(Si, Al)_3(O,N)_4$:Eu); a sialon phosphors (e.g., $Ca(Si,Al)_{12}(O,N)_{16}$:Eu); SLA phosphors (e.g. $SrLiAl_3N_4$:Eu); nitride phosphors such as CASN phosphors (e.g. $CaAlSiN_3$: Eu) and SCASN phosphors (e.g., $(Sr, Ca)AlSiN_3$: Eu); fluorine phosphors such as KSF (e.g., $K_2SiF_6$:Mn), KSAF phosphors (e.g., $K_2Si_{0.99}Al_{0.01}F_{5.99}$: Mn) and MGF phosphors (e.g., 3.5MgO $0.5MgF_2$—$GeO_2$:Mn); phosphors with perovskite structure (e.g. $CsPb(F,Cl,Br,I)_3$); quantum dot phosphors (e.g., CdSe, InP, $AgInS_2$, $AgInSe_2$), etc.

The KSAF phosphor may have a composition represented by formula (I).

$$M_2[Si_pAl_qMn_rF_s] \quad (I)$$

In formula (I), M represents an alkali metal and may contain at least K. Mn may be a tetravalent Mn ions. p, q, r and s are 0.9≤p+q+r≤1.1, 0<q≤0.1, 0<r≤0.2, 5.9≤s≤6.1 may be satisfied. Preferably, 0.95≤p+q+r≤1.05 or 0.97≤p+q+r≤1.03, 0.95≤p+q+r≤1.05 or 0.97≤p+q+r≤1.03, 0<q≤0.03, 0.002≤q≤0.02 or 0.003≤q≤0.015, 0.005≤r≤0.15, 0.01≤r≤0.12 or 0.015≤r≤0.1, 5.92≤s≤6.05 or 5.95≤s≤6.025 may be satisfied. The KSAF phosphor, for example, may have a composition represented by $K_2[Si_{0.946}Al_{0.005}Mn_{0.049}F_{5.995}]$, $K_2[Si_{0.942}Al_{0.008}Mn_{0.050}F_{5.992}]$, or $K_2[Si_{0.939}Al_{0.014}Mn_{0.047}F_{5.986}]$. According to such KSAF phosphors, red light with high luminance and narrow half-width of the emission peak wavelength can be obtained.

Some or all of the plurality of first light-transmissive members 31 may be formed from only a light-transmissive material, and some or all may contain a phosphor. In this case, some or all of the plurality of first light-transmissive members 31 may contain the same phosphor, or some or all may contain different phosphors. All of the plurality of first light-transmissive members 31 may contain a phosphor that is excited by blue light and emits yellow light. Also, some of the plurality of first light-transmissive members 31 may contain a phosphor that is excited by blue light and emits yellow light, and another some of the plurality of first light-transmissive members 31 may contain a phosphor that is excited by blue light and emits orange light. Light of the desired color can be emitted from the upper surface of a first light-transmissive member 31 by adjusting the type or content of the phosphor contained in the first light-transmissive member 31.

Figure 3C:
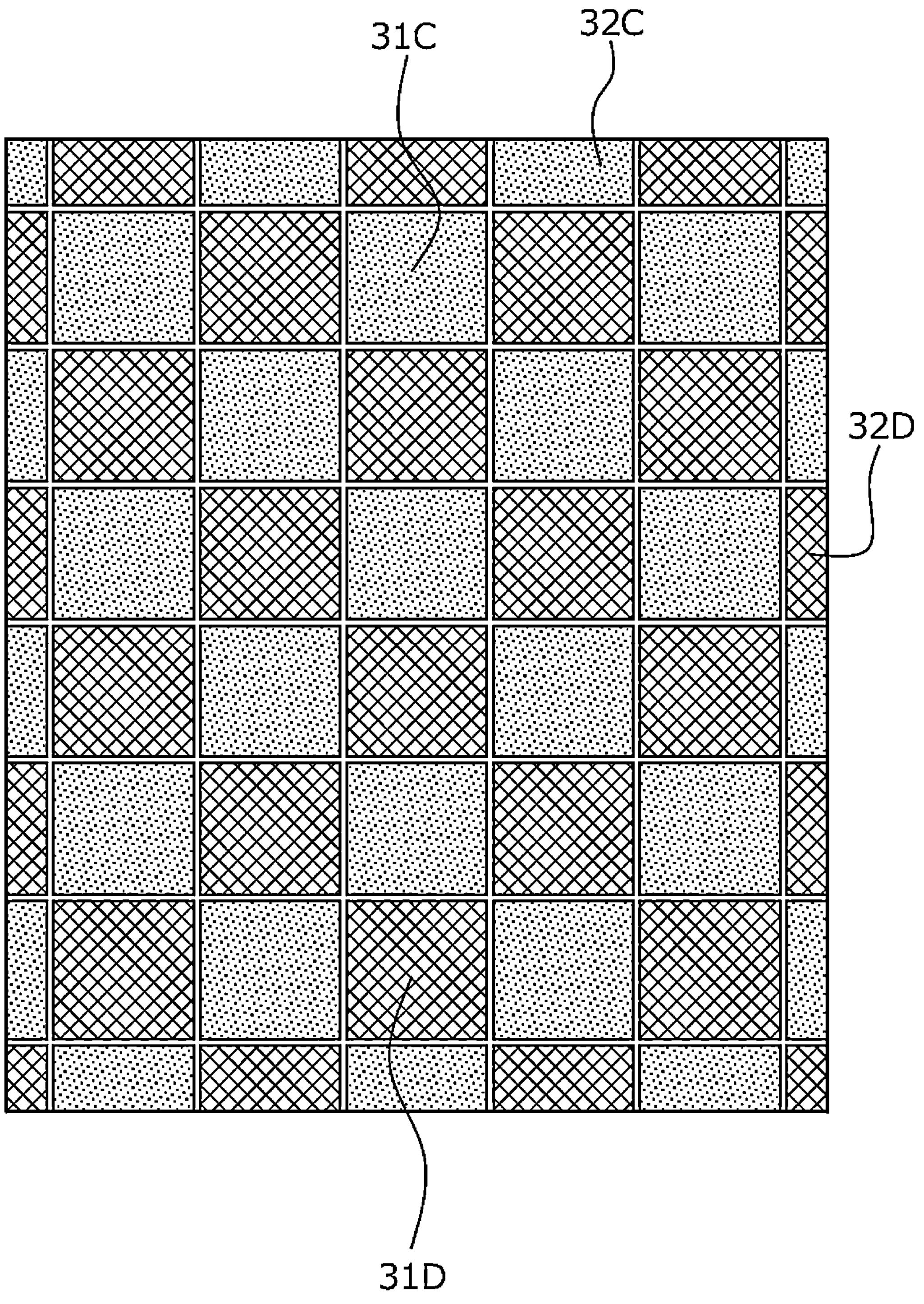
FIG. 3C is a schematic top view showing another modification example of the light-transmissive member in the light source in an embodiment.

In a light source including a plurality of light emitting elements 1 that emit blue light, as shown in FIG. 3C, first light-transmissive members 31C and first light-transmissive members 31D that emit light of different colors from their upper surface can be arranged alternately in the X direction and the Y direction. The first light-transmissive members 31C contain a phosphor that is excited by blue light and emits yellow light, and white light is emitted from the upper surfaces of the first light-transmissive members 31C. The first light-transmissive members 31D contain a phosphor that is excited by blue light and emits red light, and a phosphor that emits yellow light, and orange light is emitted from the upper surfaces. This affords a light source with which the emitted light color can be adjusted over a range of from white light to orange light. In this case, the second light-transmissive members 32C and 32D are preferably also arranged alternately in the X direction and the Y direction so as to correspond to the first light-transmissive members 31C and 31D. Here, the second light-transmissive members 32C contain a phosphor that emits yellow light, just like the first light-transmissive members 31C, and the second light-transmissive members 32D contain a phosphor that emits red light and a phosphor that emits yellow light, just like the first light-transmissive members 31D.

Figure 3D:
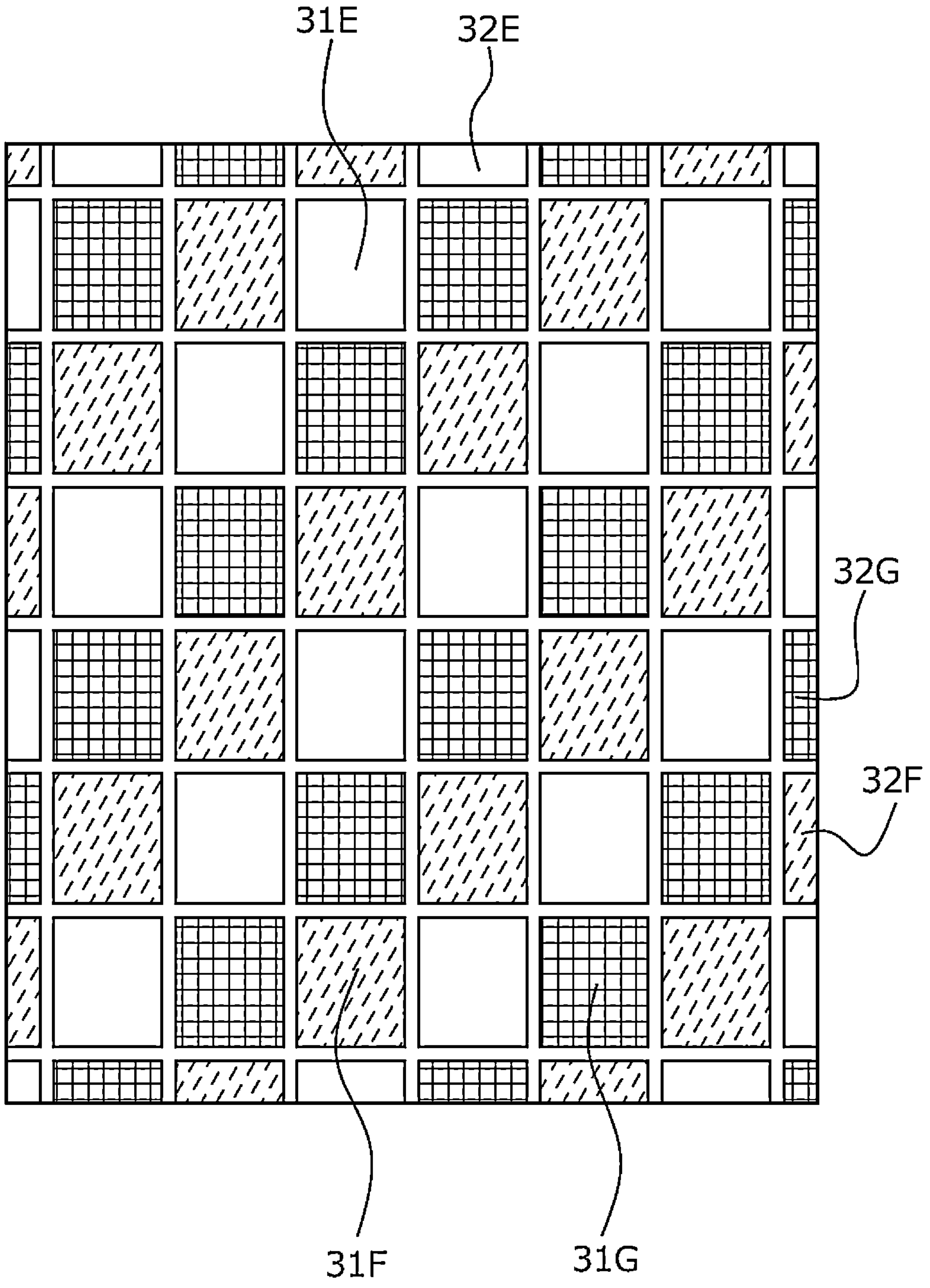
FIG. 3D is a schematic top view showing another modification example of the light-transmissive member in the light source in an embodiment.

Also, in a light source including a plurality of light emitting elements 1 that emit blue light, as shown in FIG. 3D, first light-transmissive members 31E, first light-transmissive members 31F and first light-transmissive members 31G that emit light of different colors emitted from their upper surfaces can be arranged alternately in the X direction and the Y direction, respectively. The first light-transmissive members 31E do not contain a phosphor, and blue light is emitted from the upper surfaces of the first light-transmissive members 31E. The first light-transmissive members 31F contain a phosphor that is excited by blue light and emits red light, and red light is emitted from the upper surfaces of the first light-transmissive members 31F. The first light-transmissive members 31G contain a phosphor that is excited by blue light and emits green light, and green light is emitted from the upper surfaces of the first light-transmissive members 31G. This allows blue, green and red lights to be emitted, so a light source capable of multicolor display can be obtained. In this case, it is preferable for the second light-transmissive members 32E, 32F and 32G to be similarly arranged in the X direction and the Y direction, in that order, corresponding to the first light-transmissive members 31E, 31F and 31G. Here, the second light-transmissive members 32E are similar to the first light-transmissive members 31E in terms of not containing a phosphor, the second light-transmissive members 32F are similar to the first light-transmissive members 31F in terms of containing a phosphor that emits red light, and the second light-transmissive members 32G are similar to the first light-transmissive members 31G in terms of containing a phosphor that emits green light.

The light-transmissive members 3 may contain a light diffusing substance. Examples of the light diffusing substance include particles of titanium oxide, aluminum oxide, silicon oxide, zinc oxide, and the like. By dispersing such a light diffusing substance in the light-transmissive members, or by providing the light-transmissive members with a layer containing such particles, the light emitted from the light emitting elements 1 can be diffused before being emitted to the outside. This makes suppresses light emission unevenness on the upper surfaces of the light-transmissive members 3.

The distance between adjacent first light-transmissive members 3 may be the same as or different from that between adjacent first light-transmissive members, that between the adjacent first light-transmissive members and second light-transmissive members, and that between adjacent second light-transmissive members. For example, this distance may be in a range of at least 10 μm and no more than 200 μm, preferably in a range of at least 30 μm and no more than 100 μm, more preferably in a range of at least 40 μm and no more than 80 μm.

These light-transmissive members 3 are disposed on the plurality of light emitting elements 1 as the first light-transmissive members 31, and on the outer periphery of all the light emitting elements 1 as the second light-transmissive members 32. Consequently, in the case where the light source is seen from the light emitting surface side of the light source (that is, from the light emitting surface side of the light emitting elements), the surface area of the light blocking member 2 located on the outer periphery of the light source can be reduced. As a result, in the case where the light source is seen from the outside, for example, the light blocking member 2 on the outer periphery will not stand out, and this improves the aesthetic design of the light source. In particular, it will be less likely that a difference in color between the light-transmissive members 3 and the light blocking member 2 will be noticed from the outside in the case where the light emitting elements are not lit.

Figure 4A:
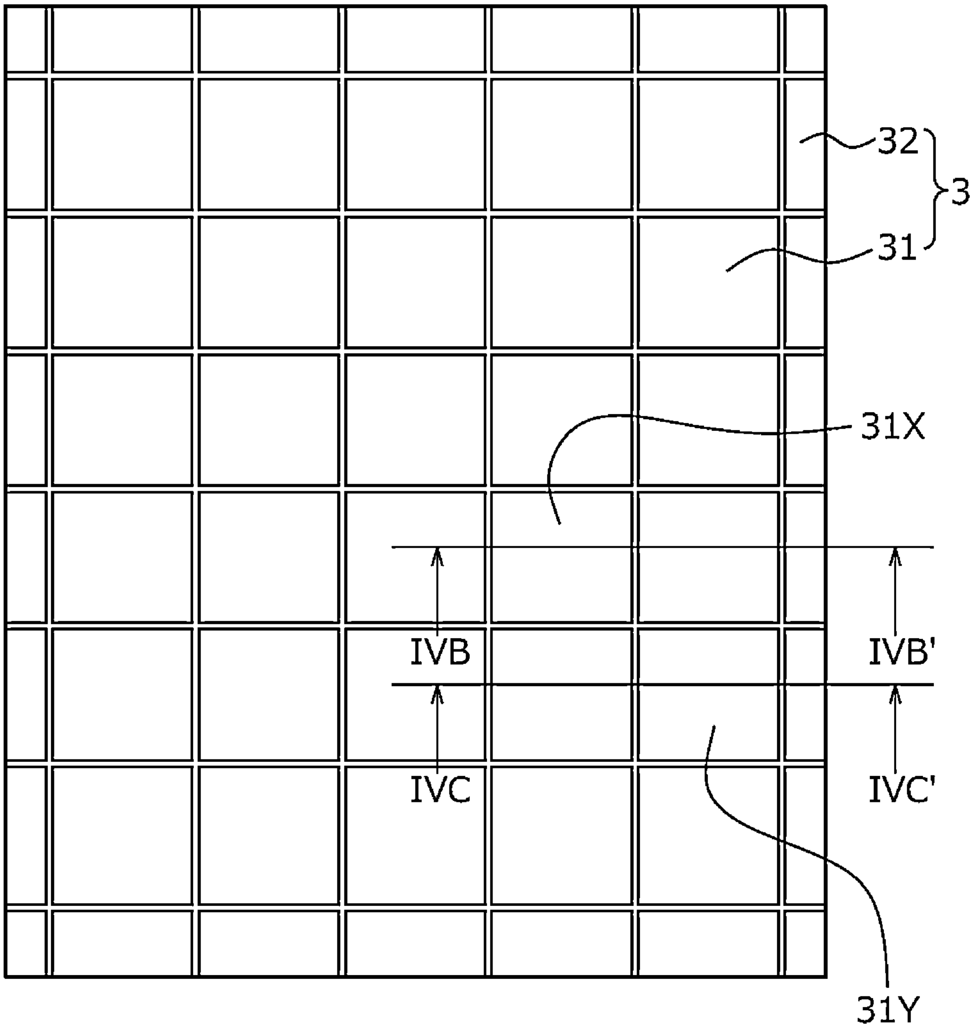
FIG. 4A is a schematic top view for describing the light emission mode in the light source of the embodiment.
Figure 4B:
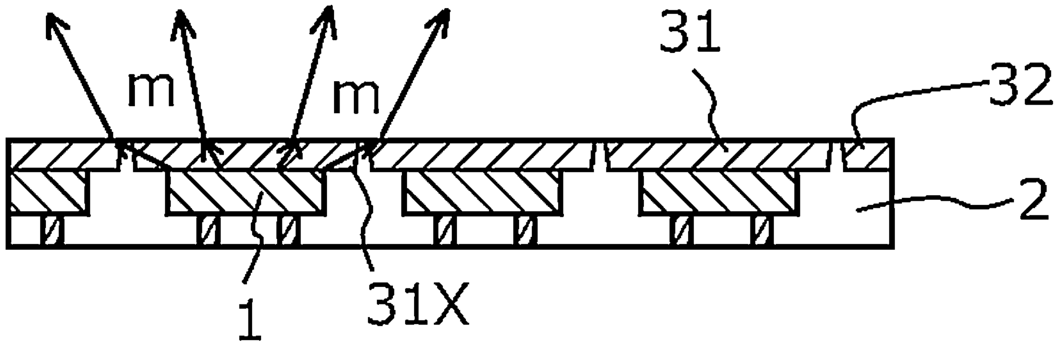
FIG. 4B is a cross-sectional view along IVB-IVB' line in FIG. 4A.
Figure 4C:
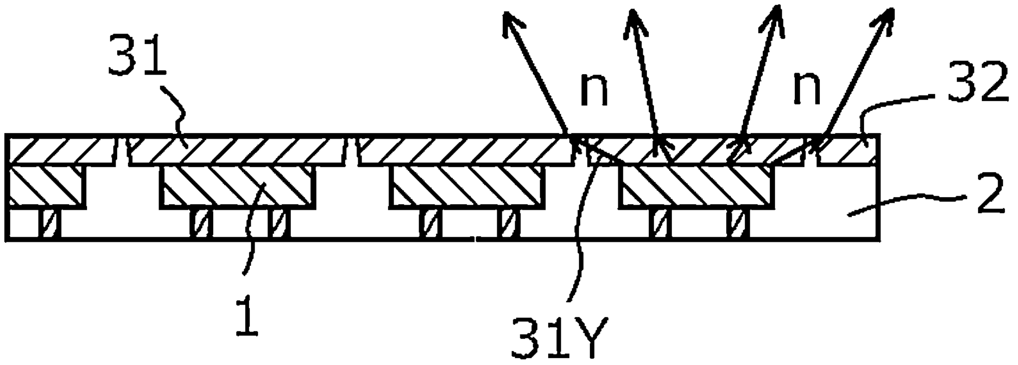
FIG. 4C is a cross-sectional view along IVC-IVC' line in FIG. 4A.
Figure 4D:
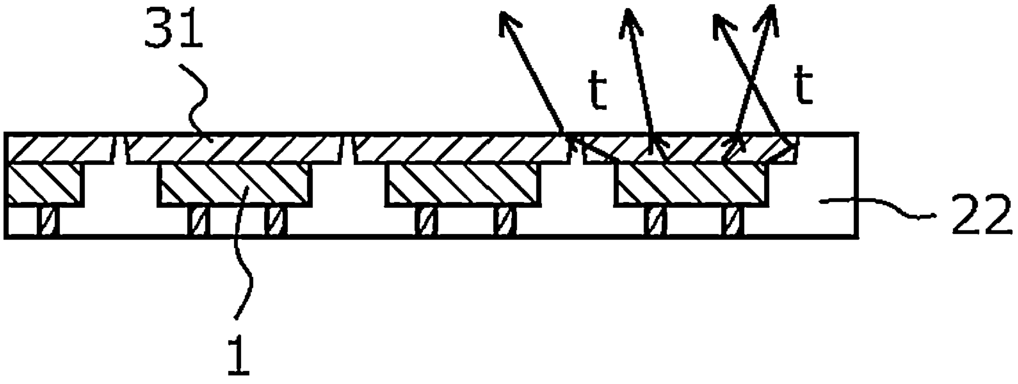
FIG. 4D is a schematic cross-sectional view for describing the light emission mode of a light source in a comparative example of an embodiment.

Also, because the light source 1 includes the second light-transmissive members 32, as shown in FIGS. 4B and 4C, the light m passing through a light-transmissive member 31X in the case where the light emitting element 1 located on the inside is lit, and the light n passing through a light-transmissive member 31Y in the case where the light emitting element 1 located on the outside is lit can be approximated spreads of the lights to each other at the light emitting surface sides. By contrast, in the case where the second light-transmissive member is not disposed on the outer periphery, as shown in FIG. 4D, the light emitting member 22 located on the outer periphery of all the light emitting elements may impede the travel of the light t emitted from the light emitting elements 1 located on the outside, resulting in an uneven spread of the light on the light emitting surface sides. Thus, with this embodiment, a light source can be obtained in which, in the case where specific light emitting elements are lit from among the plurality of light emitting elements, the spread of light will be the same for the light emitting elements located on the outside and the light emitting elements located on the inside.

In FIGS. 4B to 4D, for the sake of simplicity, the refraction of light between members on the inside of the light source is not depicted.

Light Diffusion Layer 4

Figure 5:
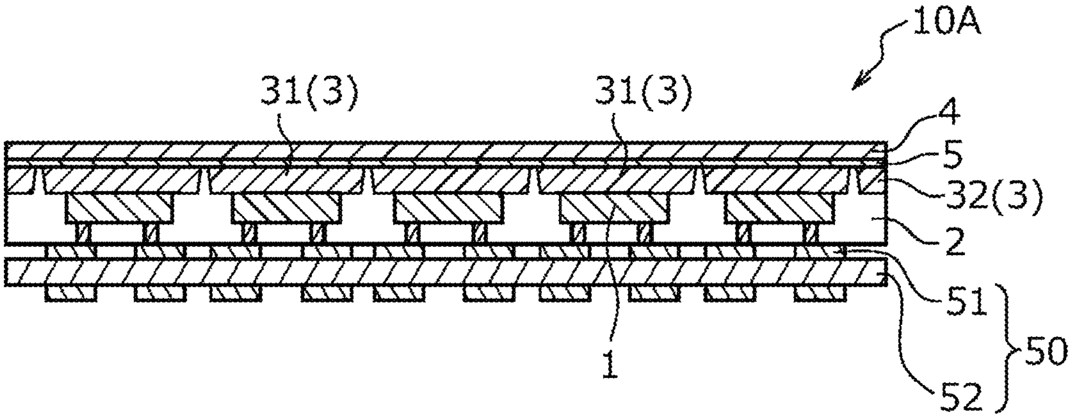
FIG. 5 is a schematic cross-sectional view showing another example of the light source in an embodiment.

As shown in FIG. 5, the light source 10A in an embodiment may further include a light diffusion layer 4 that covers the upper surface of the light-transmissive members 3. The light diffusion layer 4 may cover only some of the light-transmissive members 3, but preferably integrally covers all of the first light-transmissive members 31 and the second light-transmissive members 32. It is preferable here for the light diffusing layer 4 to cover the entire upper surface of the light source 10A, including the light blocking member 2 between the light-transmissive members 3. Consequently, in the case where adjacent light emitting elements 1 are lit, it is less likely that the non-light emitting region between the adjacent light emitting regions will be visible from the outside as a region of low luminance.

The function of the light diffusion layer 4 is to diffuse and guide the light emitted from the light emitting elements 1. The light diffusion layer 4 may be a single layer or may have a stacked structure including a plurality of layers. The light diffusing layer 4 has a total light transmittance (Tr) of 30% to 99% and a diffusion rate (D) of 10% to 90%, for example. An example of the thickness of the light diffusion layer 4 is at least 10 μm and no more than 200 μm.

The light diffusion layer 4 may be in contact with the upper surfaces of the light blocking member 2 and the light-transmissive members 3, or may be disposed with a space between itself and the upper surfaces of the light blocking member 2 and the light-transmissive members 3. It is especially favorable for the lower surface of the light diffusing layer 4 to be in direct contact with the upper surfaces of the light blocking member 2 and the light-transmissive members 3. This allows the light from the light emitting elements 1 to be efficiently introduced into the light diffusion layer 4, and improves the light extraction efficiency. Also, the light diffusion layer 4 may be in contact with the upper surfaces of the light blocking member 2 and the light-transmitting members 3 via a light-transmitting layer, an adhesive layer, or the like as a light-transmitting layer 5.

The light diffusing layer 4 contains a light-transmissive resin and a light diffusing substance contained in the light-transmissive resin. The same materials as the light-transmissive resin and the light diffusing substance used for the light-transmissive members 3 can be used as the light-transmissive resin and the light diffusing substance. The light diffusing layer 4 may also be formed of a resin having little absorption of visible light, such as a polycarbonate resin, a polystyrene resin, or a polyethylene resin. The surface of the light diffusion layer 4 may be flat or may have fine recesses and fine asperities, etc.

Mounting Substrate 50

As shown in FIG. 5, in the light source 10A in one embodiment, a plurality of light emitting elements 1 may be mounted on a mounting substrate 50.

An example of the mounting substrate 50 is one having on at least the upper surface thereof wiring 51 that is connected to the light emitting elements 1, and a substrate 52 that supports the wiring 51. The mounting substrate 50 may be a flexible printed circuit board (FPC) that can be manufactured by a roll-to-roll method, or may be a substrate that is thin enough to bend, or may be a rigid substrate.

Examples of the substrate 52 include those made from a ceramic such as aluminum oxide, aluminum nitride, silicon nitride, or mullite; those made from a thermoplastic resin such as PA (polyamide), PPA (polyphthalamide), PPS (polyphenylene sulfide), or a liquid crystal polymer; and those made from an epoxy resin, a silicone resin, a modified epoxy resin, a urethane resin, a phenol resin, or another such resin. A ceramic having excellent heat dissipation is especially preferable.

The wiring 51 may be disposed not only on the upper surface of the substrate 52, but also on the lower surface. The wiring 51 on the upper surface and the lower surface may be connected via wiring disposed on a lateral surface, or may be connected via in-layer wiring such as a via. The wiring 51 may have a partially different thickness, etc. The wiring can be formed by electrolytic plating, electroless plating, sputtering, vapor deposition, or the like. Examples of the wiring 51 include metals such as iron, copper, nickel, aluminum, gold, platinum, titanium, tungsten, and palladium, and alloys containing at least one of these.

Method for Manufacturing Light Source 10

The above-mentioned light source 10 can be manufactured by preparing a light-transmissive sheet 3*a*, disposing a plurality of light emitting elements 1 on the light-transmissive sheet 3*a*, dicing this, and disposing the light blocking member 2 between the diced regions and the light emitting elements 1.

Also, a conductive film 8 that is connected to the positive electrodes 1*p* and the negative electrodes In of the light emitting elements 1 exposed from the light blocking member 2 may be formed. Forming this conductive film 8 makes it possible to substantially increase the surface areas of the positive electrodes 1*p* and the negative electrodes In of the light emitting elements 1 exposed from the light blocking member 2, and ensures the connectivity to the substrate and so forth.

Preparation of Light-Transmissive Sheet 3*a*

Figure 6A:
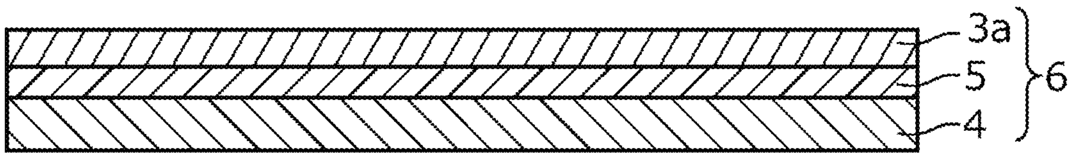
FIG. 6A is a manufacturing step diagram illustrating a method for manufacturing a light source in an embodiment.

First, a light-transmissive sheet 3*a* is prepared that can be diced into individual light-transmissive members 3. The light-transmissive sheet 3*a* may be a stacked sheet 6 produced by stacking the light diffusing layer 4 with the light-transmissive sheet 3*a*. As shown in FIG. 6A, the light-transmissive sheet 3*a* is preferably prepared as a stacked sheet 6 in which the light-transmissive layer 5 and the light diffusing layer 4 are stacked in that order with the light-transmissive sheet 3*a*. The light-transmissive sheet 3*a*, the light-transmissive layer 5, and the light diffusing layer 4 may each be a member in the form of a sheet. In this case, the layers are integrally stacked either directly or via an adhesive layer or the like. Also, the stacked sheet 6 may be formed by stacking the material of the light-transmissive sheet 3*a*, the material of the light-transmissive layer 5, and the material of the light diffusing layer 4 in that order, or the reverse order, on a support by coating, etc. The thickness of each layer can be suitably set so as to exhibit the above-mentioned characteristics. Here, the light-transmissive layer 5 may be a layer capable of transmitting at least a part of the light emitted from the light emitting elements 1. For example, this layer may be one that transmits at least 60% of the light emitted from the light emitting elements. The layer preferably transmits at least 70%, and more preferably at least 75% or at least 80%. The light-transmissive layer 5 can be formed from the light-transmissive resin or the like constituting the light-transmissive members. The thickness of the light-transmitting layer may be at least 20 μm and no more than 400 μm, for example. Since such a light-transmissive layer 5 allows the light emitted from the light emitting elements to propagate in the lateral direction, it can contribute to a reduction in luminance unevenness between light emitting portions.

Disposition of Light Emitting Elements 1

Figure 6B:
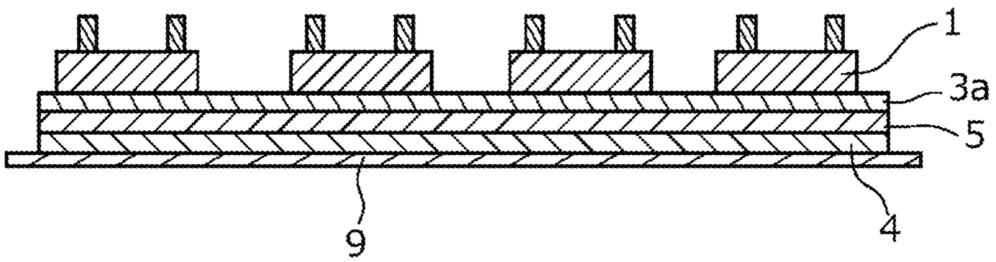
FIG. 6B is a manufacturing step diagram illustrating a method for manufacturing a light source in an embodiment.

Next, as shown in FIG. 6B, a plurality of light emitting elements 1 are arranged on the light-transmissive sheets 3*a* in the stacked sheet 6. In this case, the light emitting surface side of the light emitting elements 1 is disposed on the light-transmissive sheet 3*a*. The light emitting surfaces of the light emitting elements 1 and the light-transmissive sheet 3*a* may be fixed so as to be in direct contact, or may be fixed with a light-transmissive adhesive or the like.

Dicing

Figure 6C:
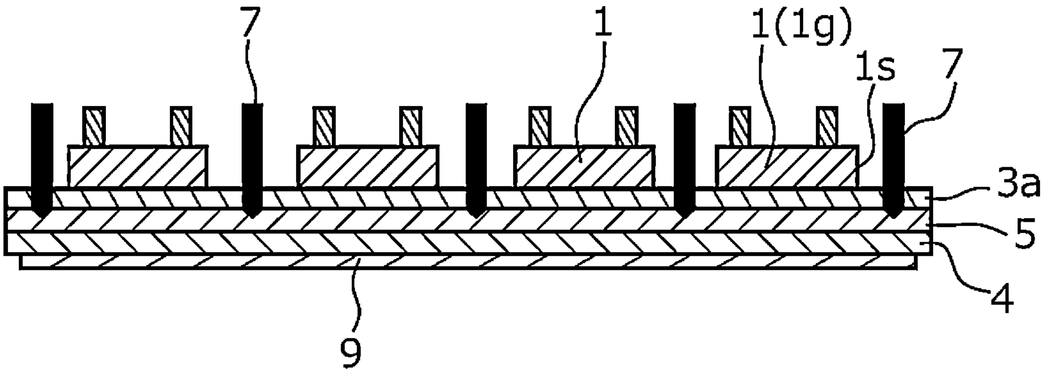
FIG. 6C is a manufacturing step diagram illustrating a method for manufacturing a light source in an embodiment.

Next, as shown in FIG. 6C, dicing is performed with a blade 7 so as to cut at least the light-transmissive sheet 3*a* all the way through in the thickness direction between the plurality of light emitting elements 1 arranged on the stacked sheet 6. Here, in the case where a stacked sheet in which the light-transmissive layer 5 and the light diffusing layer 4 are stacked on the light-transmissive sheet 3*a* is prepared as the stacked sheet 6, preferably the light-transmissive sheet 3*a* is diced all the way through in the thickness direction, and the light-transmissive layer 5 is diced all or part of the way through in the thickness direction, and the light diffusion layer 4 is not diced. That is, in the stacked sheet 6, in order to cut the light-transmissive sheet 3*a* all the way through in the thickness direction, but avoid dicing the light diffusing layer 4, the light-transmissive layer 5 is preferably disposed as a buffer layer in between the light-transmissive sheet 3*a* and the light diffusing layer 4. In this case, the light-transmissive layer 5 is cut only part of the way through in the thickness direction.

The dicing of the light-transmissive sheet 3*a* is performed between all of the light emitting elements, as well as on the outer lateral surface 1*s* side, which is on the outside of the light emitting element 1*g* disposed on the outside. In this case, the dicing is preferably performed at the same pitch in the X direction and the Y direction as the dicing performed between the light emitting elements. In plan view, the position of the dicing for obtaining individual stacked sheets 6 on the outside of the light emitting element 1*g* can be set as desired.

Formation of Light Blocking Member 2

Figure 6D:
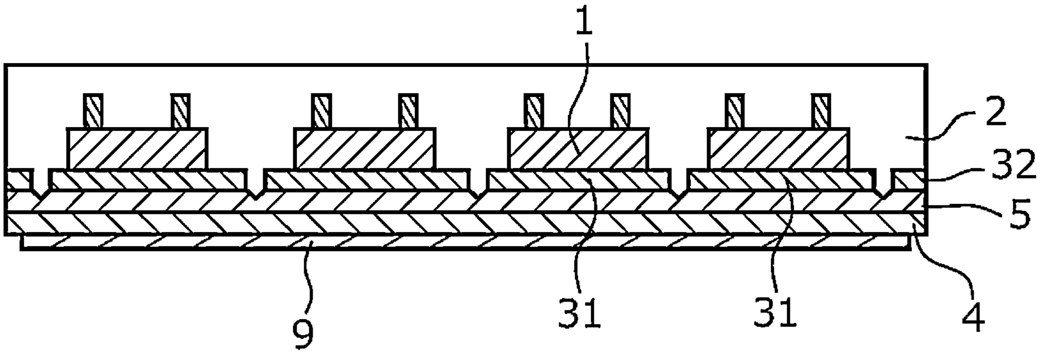
FIG. 6D is a manufacturing step diagram illustrating a method for manufacturing a light source in an embodiment.
Figure 6E:
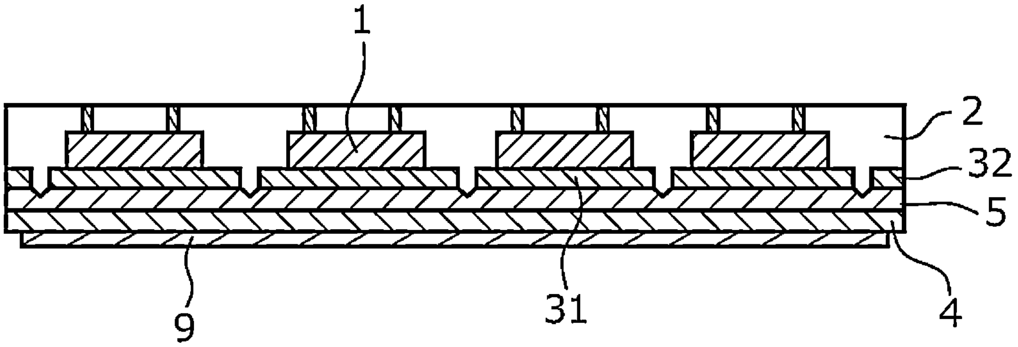
FIG. 6E is a manufacturing step diagram illustrating a method for manufacturing a light source in an embodiment.

As shown in FIG. 6D, the material constituting the light blocking member 2 is disposed on the stacked sheet 6 so as to integrally cover the plurality of light emitting elements 1. A coating of the material constituting the light blocking member 2 may be applied so as to embed all of the plurality of light emitting elements 1, or may be applied so as to expose the electrodes of the light emitting elements 1 as shown in FIG. 6E. Also, after covering all of the plurality of light emitting elements 1, that is, so as to embed everything including the electrodes, a part of the material constituting the light blocking member 2 may be removed so as to expose the electrodes of the light emitting elements 1. This removal can be performed by any method known in this field, such as etching or grinding. This allows a light source to be formed.

Formation of Conductive Film 8

Figure 6F:
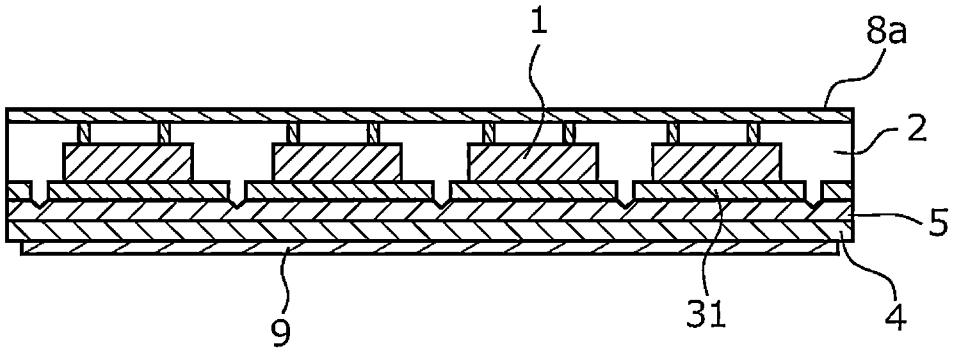
FIG. 6F is a manufacturing step diagram illustrating a method for manufacturing a light source in an embodiment.
Figure 6G:
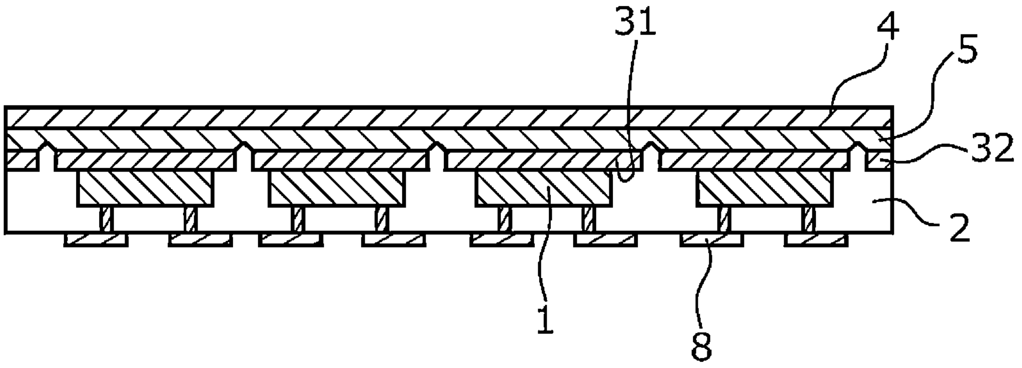
FIG. 6G is a manufacturing step diagram illustrating a method for manufacturing a light source in an embodiment.

As shown in FIG. 6F, a conductive film 8*a* is formed on the light blocking member 2 and on the electrodes exposed from the light blocking member 2. The conductive film 8*a* may be made of any electroconductive material, and can be formed from a metal such as copper, aluminum, gold, silver, platinum, titanium, tungsten, palladium, iron, or nickel, or alloys containing at least one of these metals. After this, part of the conductive film 8*a* covering the light blocking member 2 can be removed by etching or laser ablation, for example, to form a conductive film 8 a part of which covers the electrodes and the other part of which covers the light blocking member 2. The thickness of the conductive film can be suitably set according to the performance to be obtained, the material used, and so forth. For example, in the case where the conductive film is removed by laser ablation, the thickness of the conductive film is preferably 1 μm or less, and more preferably at least 125 angstroms and no more than 1000 angstroms.

Light Emitting Module

Figure 7:
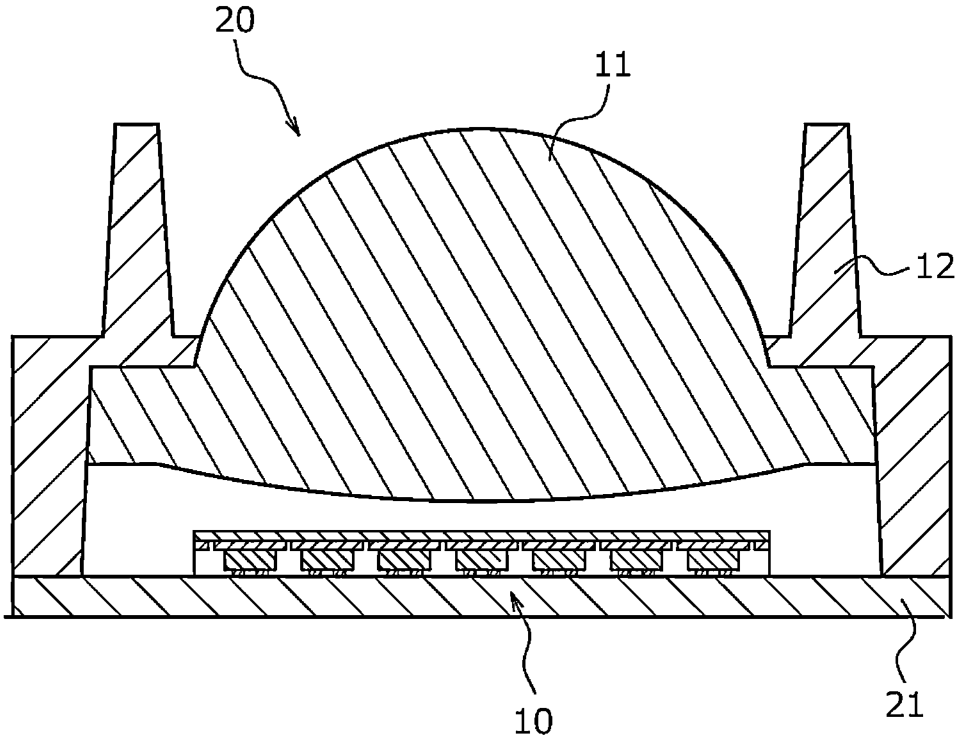
FIG. 7 is a schematic cross-sectional view showing the light emitting module in an embodiment of the present disclosure.

As shown in FIG. 7, the light emitting module 20 in an embodiment includes a substrate 21 and a light source 10 that is disposed on the substrate 21. The substrate 21 is provided with a wiring layer on its surface, and this wiring layer may be formed so that the light emitting elements can be matrix-driven in segment units, for example, or may be formed so that local dimming can be performed.

The light emitting module 20 may include a lens 11 that is disposed on the light source 10. The lens 11 here can be a lens exhibiting any of various functions, such as a convex lens, a concave lens, or a Fresnel lens. Also, a housing 12 may be provided to support the lens 11.

The light sources and light-emitting modules described in each embodiment can be used as flash light sources for cameras, headlights for vehicles, backlights for liquid crystal displays, and various lighting fixtures.

What is claimed is:

1. A light source comprising:
a plurality of light-transmissive members with upper surfaces of the light-transmissive members being flush with each other, the light-transmissive members including
a plurality of first light-transmissive members arranged to form a rectangular shape as a whole in a plan view, and
a plurality of second light-transmissive members arranged in a rectangular frame shape as a whole surrounding the first light-transmissive members in the plan view, each of the second light-transmissive members being smaller than each of the first light-transmissive members in the plan view; and
a plurality of light emitting elements arranged under the first light-transmissive members with none of the light emitting elements being arranged under the second light-transmissive members.

2. The light source according to claim 1, further comprising
a light blocking member arranged between adjacent ones of the light-transmissive members.

3. The light source according to claim 2, wherein
the light blocking member covers lateral surfaces of the light emitting elements to hold the light emitting elements together.

4. The light source according to claim 1, wherein
at least one of the second light-transmissive members is smaller than another of the second light-transmissive members in the plan view.

5. The light source according to claim 4, wherein
four of the second light-transmissive members arranged respectively at four corners of the rectangular frame shape in the plan view are each smaller than each of the rest of the second light-transmissive members.

6. The light source according to claim 1, wherein
the light emitting elements are configured to emit blue light.

7. The light source according to claim 1, wherein
the light-transmissive members include phosphors.

8. The light source according to claim 7, wherein
the phosphors are configured to be excited by blue light to emit yellow light.

9. The light source according to claim 7, wherein
the phosphors include
first phosphors configured to be excited by blue light to emit yellow light, and
second phosphors configured to be excited by blue light to emit orange light.

10. The light source according to claim 1, wherein
the light-transmissive members contain a light diffusing substance.

11. The light source according to claim 1, wherein
each of the first light-transmissive members is larger than a corresponding one of the light emitting elements in the plan view.

12. The light source according to claim 11, wherein
each of the first light-transmissive members encompasses an outer edge of a corresponding one of the light emitting elements in the plan view.

13. The light source according to claim 1, further comprising
a light diffusion layer arranged above the light-transmissive members.

14. The light source according to claim 13, further comprising
a light-transmitting layer arranged above the light diffusion layer.

* * * * *